(12) United States Patent
Leroux et al.

(10) Patent No.: US 8,714,969 B2
(45) Date of Patent: *May 6, 2014

(54) STAGED COMBUSTION METHOD WITH OPTIMIZED INJECTION OF PRIMARY OXIDANT

(75) Inventors: Bertrand Leroux, Issy les Moulineaux (FR); Remi Pierre Tsiava, St Germain les Corbeil (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 682 days.

This patent is subject to a terminal disclaimer.

(21) Appl. No.: 10/582,242

(22) PCT Filed: Dec. 6, 2004

(86) PCT No.: PCT/FR2004/050654
§ 371 (c)(1),
(2), (4) Date: Feb. 27, 2007

(87) PCT Pub. No.: WO2005/059440
PCT Pub. Date: Jun. 30, 2005

(65) Prior Publication Data
US 2007/0172781 A1  Jul. 26, 2007

(30) Foreign Application Priority Data
Dec. 16, 2003  (FR) .................................. 03 51078

(51) Int. Cl.
*F23M 3/04* (2006.01)

(52) U.S. Cl.
USPC .............. 431/10; 431/8; 431/164; 431/181; 431/188

(58) Field of Classification Search
USPC .............. 431/8, 10, 188, 159, 164, 165, 166, 431/167, 174, 178, 179, 181, 187; 65/134.4
See application file for complete search history.

(56) References Cited

U.S. PATENT DOCUMENTS 4,294,178 A * 10/1981 Borio et al. .................... 110/347
4,551,090 A * 11/1985 Leikert et al. ................. 431/188
(Continued)

FOREIGN PATENT DOCUMENTS

| EP | 0 748 981 | * 12/1996 | ............... F23C 6/04 |
|---|---|---|---|
| EP | 0 763 692 | 3/1997 | |

(Continued)

OTHER PUBLICATIONS

International Search Report for PCT/FR2004/050654.

*Primary Examiner* — Kang Hu
*Assistant Examiner* — John C Hailey, III
(74) *Attorney, Agent, or Firm* — Christopher J. Cronin; Natalie de Vleeschauwer

(57) ABSTRACT

The invention relates to a fuel combustion method in which one jet of fuel and at least two jets of oxidant are injected. According to the invention, the first jet of oxidant, known as the primary oxidant jet, is injected such as to be in contact with the jet of fuel and to produce a first incomplete combustion, the gases produced by said first combustion comprising at least one part of the fuel, and the second jet of oxidant is injected at a distance from the jet of fuel such as to combust with the part of the fuel present in the gases produced by the first combustion. Moreover, the primary oxidant jet is divided into two primary jets, namely: a first primary oxidant jet, known as the central jet, which is injected at the centre of the jet of fuel; and a second primary oxidant jet, knows as the sheathing jet, which is injected coaxially around the fuel jet.

9 Claims, 1 Drawing Sheet

(56) References Cited

U.S. PATENT DOCUMENTS

| | | | |
|---|---|---|---|
| 5,007,823 A * | 4/1991 | Mayotte et al. | 432/14 |
| 5,178,533 A * | 1/1993 | Collenbusch | 431/8 |
| 5,439,373 A * | 8/1995 | Anderson et al. | 431/10 |
| 5,572,938 A * | 11/1996 | Leger | 110/346 |
| 5,580,237 A * | 12/1996 | Leger | 431/8 |
| 5,692,678 A * | 12/1997 | Ishibashi et al. | 239/80 |
| 5,755,818 A * | 5/1998 | Tuson et al. | 431/10 |
| 6,196,831 B1 * | 3/2001 | Dugue et al. | 431/8 |
| 6,241,514 B1 * | 6/2001 | Joshi et al. | 432/105 |
| 6,318,278 B1 * | 11/2001 | Dugue et al. | 110/348 |
| 6,325,003 B1 * | 12/2001 | Ashworth et al. | 110/345 |
| 6,422,041 B1 * | 7/2002 | Simpson et al. | 65/134.4 |
| 6,544,029 B2 * | 4/2003 | Marin et al. | 431/165 |
| 6,699,029 B2 * | 3/2004 | Kobayashi et al. | 431/10 |
| 6,699,030 B2 * | 3/2004 | Bool et al. | 431/10 |
| 6,705,117 B2 * | 3/2004 | Simpson et al. | 65/134.4 |
| 6,705,118 B2 * | 3/2004 | Simpson et al. | 65/134.4 |
| 6,910,879 B2 * | 6/2005 | Dugue et al. | 431/8 |
| 6,938,560 B2 * | 9/2005 | Okazaki et al. | 110/204 |
| 6,978,726 B2 * | 12/2005 | Kobayashi et al. | 110/347 |
| 2001/0039813 A1 * | 11/2001 | Simpson et al. | 65/134.4 |
| 2003/0099912 A1 * | 5/2003 | Kobayashi et al. | 431/10 |
| 2003/0099913 A1 * | 5/2003 | Kobayashi et al. | 431/10 |
| 2004/0157178 A1 | 8/2004 | Dugue et al. | |
| 2009/0239182 A1 * | 9/2009 | Tsiava et al. | 431/12 |

FOREIGN PATENT DOCUMENTS

| | | | |
|---|---|---|---|
| EP | 763692 A2 * | 3/1997 | F23D 14/22 |
| EP | 0 877 203 | 11/1998 | |
| FR | 2 830 606 | 4/2003 | |
| FR | 2830606 A1 * | 4/2003 | F23N 5/00 |
| FR | 2853953 * | 10/2004 | |
| JP | 9-310808 | 12/1997 | |
| WO | WO 02 081967 | 10/2002 | |
| WO | WO 02081967 A1 * | 10/2002 | |

* cited by examiner

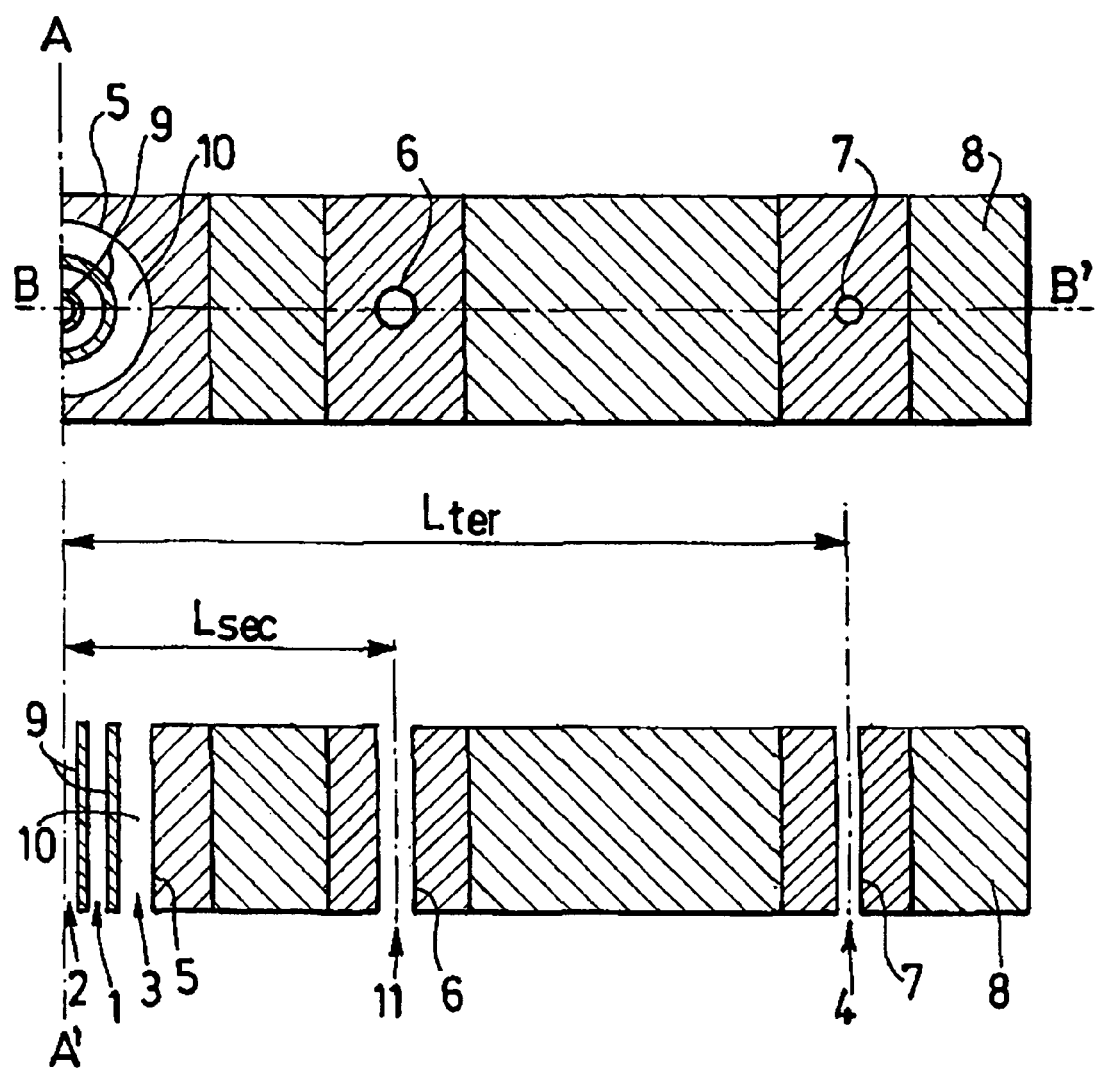

STAGED COMBUSTION METHOD WITH OPTIMIZED INJECTION OF PRIMARY OXIDANT

The present invention relates to a staged combustion method using a primary jet of oxidizer and a secondary jet of oxidizer, in which the injection of the primary oxidizer has been optimized.

The performance of a combustion method in an industrial furnace must satisfy two criteria:
- limit the discharges of atmospheric pollutants (NOx, dust, etc.) that must be less in quantity than the limit set by the legislation,
- control the temperature of the furnace walls and of the charge to be heated in order to satisfy both the constraints relative to the quality of the product subjected to the combustion and to the consumption of energy. An advantageous solution for satisfying these two criteria is to reduce the temperature of the combustion flame and one of the means used is staged combustion. The method of staged combustion of fuels involves dividing the quantity of oxidizer necessary for the total combustion of the fuel into at least two streams of oxidizer introduced at various distances from the flow of fuel. Thus, a first stream of oxidizer is injected very close to the stream of fuel. This stream closest to the stream of fuel is called the primary stream; it allows the partial combustion of the fuel at a controlled temperature which limits the formation of NOx. The other streams of oxidizer are injected at a greater distance from the fuel than the primary stream of oxidizer; they make it possible to complete the combustion of the fuel that has not reacted with the primary oxidizer. These streams are called the secondary streams. Document WO 02/081967 describes a method making it possible to apply this type of staged combustion method. The oxidizer is separated into three distinct streams, that are injected at various distances from the point of injection of the fuel and at various velocities. Thus, a first jet of oxidizer is injected with a high velocity at the center of the jet of fuel. Then, a second jet of oxidizer is injected with a lower velocity at a first distance from the jet of fuel. Finally, a third jet of oxidizer is injected at a second distance from the jet of fuel, this second distance being greater than the first distance.

It may be useful to apply this type of method with variable burner powers, for example when the furnace charge changes. It may thus be desirable to use low burner powers, that is to say to use burners with low fuel velocities relative to the nominal regime of the burners. Now, the use of the burners with low fuel velocities relative to the nominal regime may lead to raising of the flame: for an injection of the fuels and oxidizers in a horizontal plane, the flame rises toward the roof of the industrial furnace and may damage it.

The aim of the present invention is to propose a staged combustion method in which it is possible to modify the power of the burner, and in particular to reduce it relative to its nominal power, without this change of power leading to a change of flame direction and to the impairment of the furnace wall.

With this objective, the invention therefore relates to a method of fuel combustion, in which a jet of fuel and at least two jets of oxidizer are injected, the first jet of oxidizer, called the primary jet, being injected so as to be in contact with the jet of fuel and to generate a first incomplete combustion, the gases originating from this first combustion still comprising at least a portion of the fuel, and the second jet of oxidizer being injected at a distance from the jet of fuel in such a way as to combust with the portion of the fuel present in the gases originating from the first combustion, in which the primary jet of oxidizer is divided into two primary jets:
- a first primary jet of oxidizer, called the central primary jet, injected in the center of the jet of fuel, and
- a second primary jet of oxidizer, called the sheathing primary jet, injected coaxially around the jet of fuel.

The invention therefore consists of a staged combustion method in which the oxidizer necessary for the combustion of the fuel is divided into two jets. The first jet, called the primary jet, is injected in contact with the jet of fuel, which means that the distance between the jet of fuel and the primary jet of oxidizer is zero (apart from the possible presence of a duct wall channeling these various jets). According to the essential feature of the invention, the primary jet of oxidizer is divided into two jets injected differently from the jet of fuel. The first primary jet of oxidizer, called the central jet, is injected in the center of the jet of fuel, and the second primary jet of oxidizer, called the sheathing primary jet, is injected coaxially around the jet of fuel. In practice, this method may be applied by the use of an injection pipe consisting of two concentric tubes, one for the injection of the fuel, the other for the central primary oxidizer. The injection pipe is placed in a ceramic quarl and the sheathing primary oxidizer is injected into the space defined between the quarl and the injection pipe. The end of the injection pipe may be set back from or in the same plane as the injection wall in the furnace.

According to the invention, the quantity of oxidizer present in the primary jet of oxidizer is less than the total quantity of oxidizer necessary for the total combustion of the fuel. The second jet of oxidizer makes it possible to supply the quantity of oxidizer necessary to complete the combustion of the fuel. The second jet of oxidizer is injected at a distance from the second primary jet of oxidizer, which means that the distance between these two jets is not zero. Preferably, this distance is at least 80 mm, still more preferably at least 90 mm. Generally, the sum of the quantities of all the injected oxidizers is substantially stoichiometric, that is to say lying in a range of ±15% relative to the stoichiometric quantity necessary for the total combustion of the fuel. The quantity of second oxidizer usually represents 10 to 98% of the total quantity of oxidizer injected, preferably 50 to 98%, still more preferably 75 to 98%, the primary oxidizer (which corresponds both to the central primary oxidizer and the sheathing primary oxidizer) representing a quantity lying between 2 and 90%, preferably between 2 and 50%, yet more preferably between 2 and 25% of the total quantity of oxidizer.

According to the invention, it is preferable for the injection velocity of the central primary jet of oxidizer to be greater than the injection velocity of the jet of fuel. Through this feature, the central jet of oxidizer ensures both a good conveyance of the jet of fuel and a sufficiently high velocity of this jet of fuel. Thus, the fuel is perfectly conveyed toward the zone of combustion with the second oxidizer. The injection velocity of the central primary jet of oxidizer is usually at least 50 m/s, preferably lying between 50 and 150 m/s. The injection velocity of the jet of fuel is preferably greater than the injection velocity of the sheathing primary jet of oxidizer, still more preferably between 5 and 15 m/s. According to an advantageous embodiment, the injection velocity of the second jet of oxidizer may be greater than the injection velocity of the sheathing primary jet of oxidizer.

According to the invention, the distance at which the second jet of oxidizer is injected and the velocity of this second jet of oxidizer are preferably such that the ratio of the distance defined between the point of injection of the central primary jet of oxidizer and the point of injection of the second jet of oxidizer to the injection velocity of the second jet of oxidizer lies between $10^{-3}$s and $10^{-2}$s, preferably between $3\times10^{-3}$s and $8.5\times10^{-3}$s. This relation solves the problem of the invention while providing a low emission of NOx and an improved flame luminosity making it possible for the operator to visually check the combustion.

According to a particular embodiment of the method of the invention, a third jet of oxidizer may be injected at a point situated between the point of injection of the central primary jet of oxidizer and the point of injection of the second oxidizing jet. The advantage of the injection of this third oxidizing jet is that it makes it possible to vary the flow rates between the second and third jets of oxidizer and modify the momentum of the burner and the length of the flame in order to control the furnace charge transfer profile. Preferably, the injection velocity of the second jet of oxidizer is greater than or equal to the injection velocity of the third jet of oxidizer. It has been observed that it is preferable for the ratio of the distance defined between the point of injection of the second jet of oxidizer and the point of injection of the central primary jet of oxidizer to the distance defined between the point of injection of the third jet of oxidizer and the point of injection of the central primary jet of oxidizer to lie between 2 and 10. In the case of this particular embodiment, the quantity of oxidizer present in the third jet preferably represents 50 to 75% of the total quantity of oxidizer injected by the second and third jets, this total quantity of oxidizer injected by the second and third jets representing 10 to 98% of the total quantity of oxidizer injected, preferably 50 to 98%, still more preferably 75 to 98%. According to the invention, the distance at which the third jet of oxidizer is injected and the velocity of this third jet of oxidizer are preferably such that the ratio of the distance defined between the point of injection of the central primary jet of oxidizer and the point of injection of the third jet of oxidizer to the injection velocity of the third jet of oxidizer lies between $6\times10^{-4}$s and $6\times10^{-3}$s, preferably between $1.5\times10^{-3}$s and $4\times10^{-3}$s.

According to a first variant of the method according to the invention, the two primary jets of oxidizer have the same oxygen concentration. It is then also advantageous to use an oxidizer in the second jet, and where necessary the third jet, having the same composition as the first jet, because it is then possible to have only one source of oxidizer to be divided between the various points of injection of oxidizers.

However, according to a second variant of the method according to the invention, the oxygen concentration of the central primary jet of oxidizer may be greater than the oxygen concentration of the sheathing primary jet of oxidizer and the second and third jets. This may be the case when the supply of high purity oxygen is limited. The high oxygen concentration oxidizer is then injected in the form of the central primary jet of oxidizer, while the air is injected in all the other jets of oxidizer.

The jet of second oxidizer may itself consist of a plurality of jets of second oxidizer. For a good symmetry of the combustion assembly, the jets of second oxidizer are, preferably, placed evenly around the jets of fuel and of primary oxidizer. This arrangement may also be applied to the jet of third oxidizer.

The method is preferably applied with gaseous fuels. If the fuel is liquid, it is then desirable that an atomization gas be used to atomize the liquid; according to the invention, the atomization gas may be the oxidizer, particularly air or oxygen. The atomization gas may be injected instead of the sheathing oxidizer and/or instead of the central oxidizer.

Finally, the invention relates to the use of the preceding method for the heating of a charge of glass or for a reheat furnace.

The application of the method according to the invention makes it possible to achieve the objective of a tight flame, that is to say the objective of a flame that does not deviate toward a wall of the furnace.

FIG. 1 illustrates a device for implementing the method according to the invention. FIG. 1 represents a portion of the device that is designed symmetrically relative to the axis AA'. FIG. 1 gives a front view of the device and the corresponding section along the axis BB'. The device consists of quarls 5, 6, 7 pierced in the wall of the furnace 8, and an injection pipe 9 consisting of two coaxial tubes. The injection pipe is placed in the quarl 5. This quarl 5 is wide enough for a free space 10 to exist between the outer tube of the pipe and the wall of the quarl. The primary oxidizer 2, 3 is injected both into the central tube of the pipe 9 and into the free space 10. The fuel 1 is injected into the space defined between the inner tube and the outer tube of the injection pipe 9. The second oxidizer 4 is injected into the quarl 7 furthest from the central quarl 5. The third oxidizer 11 is injected into the intermediate quarl 6.

The invention claimed is:

1. A method of fuel combustion, comprising the step of injecting a jet of fuel and at least two jets of oxidizer from a single and same furnace wall of a glass or reheat furnace containing a charge, the first jet of oxidizer, called the primary jet, being injected so as to be in contact with the jet of fuel and to generate a first incomplete combustion, the gases originating from this first combustion still comprising at least a portion of the fuel, and the second jet of oxidizer being injected at a distance from the jet of fuel in such a way as to combust with the portion of the fuel present in the gases originating from the first combustion, the fuel being a gas or a liquid, the primary jet of oxidizer being divided into two primary jets:
   a) a first primary jet of oxidizer, called a central primary jet, is injected from an inner tube in a center of the jet of fuel along an axis of the jet of fuel, the fuel being injected from an outer tube concentrically surrounding the inner tube; and
   b) a second primary jet of oxidizer, called a sheathing primary jet, injected coaxially around the jet of fuel, wherein the primary jet of oxidizer representing between 2% and 50% of a total quantity of oxidizer combusted and an injection velocity of the second jet of oxidizer is greater than an injection velocity of the sheathing primary jet of oxidizer.

2. The method of claim 1, wherein an injection velocity of the central primary jet of oxidizer is greater than an injection velocity of the jet of fuel.

3. A method of fuel combustion, comprising the step of injecting a jet of fuel and at least two jets of oxidizer from a single and same furnace wall of a glass or reheat furnace containing a charge, the first jet of oxidizer, called the primary jet, being injected so as to be in contact with the jet of fuel and to generate a first incomplete combustion, the gases originating from this first combustion still comprising at least a portion of the fuel, and the second jet of oxidizer being injected at a distance from the jet of fuel in such a way as to combust with the portion of the fuel present in the gases originating from the first combustion, the fuel being a gas or a liquid, the primary jet of oxidizer being divided into two primary jets:
   a) a first primary jet of oxidizer, called a central primary jet, is injected from an inner tube in a center of the jet of fuel along an axis of the jet of fuel, the fuel being injected from an outer tube concentrically surrounding the inner tube; and b) a second primary jet of oxidizer, called a sheathing primary jet, injected coaxially around the jet of fuel, wherein the primary jet of oxidizer representing between 2% and 50% of a total quantity of oxidizer combusted and an injection velocity of the jet of fuel is greater than an injection velocity of the sheathing primary jet of oxidizer.

4. The method of claim 1, wherein a ratio of the distance defined between a point of injection of the central primary jet of oxidizer and a point of injection of the second jet of oxidizer to an injection velocity of the second jet of oxidizer lies between $10^{-3}$s and $10^{-2}$s.

5. The method of claim 1, wherein a third jet of oxidizer is injected at a point situated between a point of injection of the central primary jet of oxidizer and a point of injection of the second oxidizing jet.

6. The method of claim 5, wherein an injection velocity of the second jet of oxidizer is greater than an injection velocity of the third jet of oxidizer.

7. The method of claim 5, wherein a ratio of a distance defined between the point of injection of the second jet of oxidizer and the point of injection of the central primary jet of oxidizer to a distance defined between the point of injection of the third jet of oxidizer and the point of injection of the central primary jet of oxidizer lies between 2 and 10.

8. The method of claim 1, wherein the two primary jets of oxidizer have a same oxygen concentration.

9. The method of claim 1, wherein an oxygen concentration of the central primary jet of oxidizer is greater than an oxygen concentration of the sheathing primary jet of oxidizer.

* * * * *